Patented Oct. 17, 1944

2,360,712

UNITED STATES PATENT OFFICE 2,360,712

PLASTIC SHEETING AND TREATMENT THEREOF

Louis Paggi, Belleville, N. J., assignor to E. I. du Pont de Nemours & Company, Wilmington, Del., a corporation of Delaware No Drawing. Application July 10, 1940, Serial No. 344,705

3 Claims. (Cl. 117—139)

This invention relates to plastic sheeting and a method of treating it, and, more particularly, to the treatment of adhesive interlayer sheeting composed of organic plastics which are commonly used in laminated glass.

The type of interlayer sheeting to which the invention is applicable is that which is composed essentially of a polyvinyl acetal resin and the surfaces of which are of an adhesive character. Although these interlayer sheetings have outstanding advantages for use in the manufacture of laminated glass, their adhesiveness, at ordinary temperatures, has raised a serious problem in handling and shipping.

In the manufacture and shipment of such interlayer sheeting, the sheeting is formed either into individual sheets, which are stacked in piles for handling and shipping, or rolled up on itself on a mandrel in continuous lengths. Even when such interlayer sheeting is not obviously tacky in the ordinary sense of the word, the successive layers thereof frequently tend to become stuck together when placed in stacks or rolled, as a result of a latent adhesiveness which may become effective only under storage conditions involving pressure resulting from the weight of the materials of the stack upon the lower sheets, or from tension in tightly wound rolls, or under summer temperatures. Such sheeting will hereinafter, for convenience, be referred to as "self-adhesive."

When the interlayer sheeting is not only self-adhesive but actually tacky, a further difficulty arises in the course of assembling it with glass as a step in the manufacture of safety glass. Such sticky and pliable interlayer sheeting cannot, except with great difficulty, be laid out flat on a sheet of glass without trapping air between the interlayer and the glass, and air thus trapped cannot practicably be squeezed out in the course of the subsequent bonding of the interlayer to glass, because the adhesiveness of the interlayer tends to seal such air bubbles in their initial position, and, further, because the application of a high pressure causes the squeezing out of the interlayer itself from between the glass. Even though the difficulty of storage and shipment can be eliminated by using the sheeting without delay at the place in which it is manufactured, the difficulty of assembling same with glass must still be met.

A primary object of the present invention is to eliminate the difficulties of handling, packing, shipping, and storing adhesive interlayer sheeting comprising a polyvinyl acetal resin and plasticizer therefor in the form of either individual sheets or continuous lengths by reducing or eradicating the adhesiveness of its surfaces. A further object is to provide simple, inexpensive means for overcoming the defects heretofore encountered in laying such sheeting flat upon sheets of glass without trapping air between the interlayer and the glass. A still further object is to provide a practical and highly efficient method of treating such sheeting to overcome the difficulties hereinbefore mentioned. Other objects will be apparent from the description of the invention given hereinafter.

The above objects are accomplished according to the present invention by treating adhesive sheeting comprising a polyvinyl acetal resin and a plasticizer therefor with a liquid comprising an acid selected from the group consisting of hydrochloric, hydrobromic, hydrofluoric, sulfuric, nitric, acetic and formic, whereby the surfaces of the sheeting are rendered non-self-adhesive or at least non-tacky, neutralizing the acid residue on the surfaces of the sheeting, and drying the sheeting.

More particularly, the invention provides a process for reducing the self-adhesiveness of the surfaces of smooth and pliable organic sheeting comprising polyvinyl butyral resin and a plasticizer therefor which comprises treating the surfaces of the sheeting with an aqueous solution comprising an acid selected from the group consisting of hydrochloric, hydrobromic, hydrofluoric, sulfuric, nitric, acetic, and formic, whereby the surfaces of the sheeting are rendered non-self-adhesive or at least non-tacky, thereafter treating the sheeting with an aqueous solution adapted to neutralize the residue of the acid on the sheeting, washing the sheeting with an aqueous solution to remove the resulting salt from the sheeting, and drying the sheeting.

This invention is independent of the manner in which the sheeting has been prepared. Examples will be given herein of the application of the process of the invention to sheeting containing no volatile solvent ingredients, to seasoned sheeting containing residual traces of solvent used in its production, and to sheeting not yet seasoned after production from a dough containing solvent, and, thus, still retaining a substantial proportion of solvent.

It is unnecessary to describe in the examples any details of the manipulation of the sheeting in carrying out the process of the invention. Interlayer sheeting to which the invention is primarily and most importantly applicable is, today, usually produced in continuous form, and it will be simple to provide tanks, rollers, sprays, drying equipment, etc., to meet the simple mechanical requirements of this process. The sheeting treated in accordance with the invention, as described in the examples, is typical of those made for use as safety glass interlayer and characterized by tackiness and self-adhesiveness pronounced enough to cause practical difficulties in commercial handling.

It will be apparent to those skilled in the art that certain factors will have a bearing on the effectiveness of the treatment given to any particular sheeting, and these factors comprise concentration of the acid used, concentration and kind of solvent, if any, used, time the sheeting remains in contact with the acid, and the temperature of the acid bath. Numerous specific examples of the treatment of various types of sheeting are given hereinafter to illustrate the invention. While the specific conditions for the optimum treatment of sheeting of any given composition will admittedly have to be determined on the basis of a few simple trials, this will be a routine matter for one skilled in the art in the light of the examples set forth.

In the following examples, illustrating specific embodiments of this invention, proportions are by weight when not otherwise designated.

Example 1

Sheeting made by continuous extrusion of a dough through a slit orifice and thereafter partially seasoned for removal of volatile solvents has the composition:

| | Per cent |
|---|---|
| Polyvinyl butyral resin | 66 |
| Dibutyl sebacate | 28.3 |
| Aqueous ethanol | 5.7 |

The polyvinyl butyral resin above was made by condensation of hydrolyzed polyvinyl acetate with butyraldehyde and analyzed as follows:

| | Per cent |
|---|---|
| Polyvinyl acetate | 0.5 |
| Polyvinyl alcohol | 19.8 |
| Polyvinyl butyral | 79.7 |

This sheeting was immersed for one minute in a mixture of 3 parts by volume of concentrated aqueous hydrochloric acid and 1 part by volume of water at a temperature of 23° C., after which it was immersed for about one minute in a saturated aqueous solution of sodium bicarbonate at approximately room temperature. After being removed from this latter solution, the interlayer sheeting was washed with water until free of sodium bicarbonate and sodium chloride. It was then dried for 30 minutes at about 65° C.

The initially tacky and self-adhesive surfaces of the sheeting were converted by this treatment into completely non-tacky and non-self-adhesive surfaces. The sheeting could be stacked or rolled up for shipment and storage and would not stick together under ordinary conditions of handling even at summer temperatures. It could be laid out upon glass sheeting without trapping air therebetween.

The treatment described did not noticeably change the appearance of the sheeting and, in particular, did not impair its transparency. Sheeting having a smooth surface prior to the treatment retained its smoothness after the treatment and could, for example, be inspected for defects by transmitted light.

The safety glass made from the sheeting so treated was in no respects inferior to that made from the same sheeting which had not been subjected to the process of this invention.

Example 2

A sheeting made by the continuous extrusion of a dough through a slit orifice and thereafter seasoned for removal of volatile solvent, having the following composition:

| | Per cent |
|---|---|
| Polyvinyl butyral resin (as in Example 1) | 69.0 |
| Dibutyl sebacate | 30.6 |
| Residual solvent— | |
| Ethyl alcohol | 0.1 |
| Water | 0.3 | was immersed for 45 seconds in concentrated aqueous hydrochloric acid (containing approximately 38% HCl), after which it was immersed for 10 seconds in a saturated aqueous solution of sodium bicarbonate. The sheeting was then immersed successively in several changes of fresh water to remove the salt formed by the interaction of acid and alkali. The above treatments were conducted at room temperature. The sheeting was then dried for 1.25 hours in air at 45° C.

Sheeting of the same composition as above, except for the complete absence of volatile solvent, was treated in the same manner and with the same results.

Example 3

A partially seasoned interlayer sheeting having the following composition:

| | Per cent |
|---|---|
| Polyvinyl butyral resin (as in Example 1) | 67.6 |
| Dibutyl sebacate | 30.4 |
| Solvent | 2.0 | was immersed in acid and then in alkali, in the manner described in Example 1, and rinsed in water sufficiently to effect the removal of the salt, and then seasoned and dried in air at 45° C. for 2 hours. The effect upon the adhesiveness of the surface of the sheeting was the same as that achieved in Example 1.

Example 4

A partially seasoned interlayer sheeting having the following composition:

| | Per cent |
|---|---|
| Polyvinyl butyral resin (as in Example 1) | 65 |
| Dibutyl sebacate | 29 |
| Solvent (mostly ethyl alcohol) | 6 | was immersed in 38% aqueous hydrochloric acid for 30 seconds, and in saturated aqueous sodium bicarbonate for 1 minute, after which it was rinsed in distilled water and then seasoned and dried in air at 45° C. for 4 hours.

In connection with the preceding examples, it is to be noted that the amount of volatile solvent present in the sheeting at the time of the acid treatment is not of importance, although heed will naturally be paid to the fact that the presence of solvent in the sheeting promotes somewhat the desired action of the aqueous acid. Also, it is to be noted that an initially well-seasoned sheet will, upon emerging from the aqueous bath or baths, require further drying. It may, accordingly, be preferable to defer the thorough seasoning of a sheet until after it has passed through the acid treatment and acid-removing treatment of the present invention, and then to subject the sheeting to a treatment adapted to remove both the residual solvent, which it contained before the acid treatment, and also the water or water and solvent which it has absorbed during and after the acid treatment.

Example 5

A commercially seasoned interlayer sheeting was used having the following composition:

| | Per cent |
|---|---|
| Polyvinyl formal resin | 54.7 |
| Diethyl phthalate | 22.4 |
| Dimethyl sebacate | 22.4 |
| Solvent (dilute ethyl alcohol) | 0.5 |

The polyvinyl formal resin above was made by condensation of hydrolyzed polyvinyl acetate with formaldehyde and analyzed as follows:

| | Per cent |
|---|---|
| Polyvinyl acetate | 14.5 |
| Polyvinyl alcohol | 7.5 |
| Polyvinl formal | 78.0 |

The sheeting was dipped for 30 seconds in concentrated (38%) aqueous hydrochloric acid, then washed in a bath of aqueous sodium bicarbonate, after which it was washed with distilled water and then dried for 2 hours at 45° C.

Example 6

An interlayer sheeting was used having the following composition:

| | Per cent |
|---|---|
| Polyvinyl formal resin | 54.6 |
| Diethyl phthalate | 34.8 |
| Tributyl citrate | 9.9 |
| Solvent | 0.7 |

The polyvinyl formal resin above was made by condensation of hydrolyzed polyvinyl acetate with formaldehyde and analyzed as follows:

| | Per cent |
|---|---|
| Polyvinyl acetate | 14.5 |
| Polyvinyl alcohol | 9.0 |
| Polyvinyl formal | 76.5 |

This sheeting was treated as in Example 5 and a non-tacky and non-self-adhesive sheeting was obtained.

Example 7

An interlayer sheeting was used having the following composition:

| | Per cent |
|---|---|
| Polyvinyl formal resin | 54.6 |
| Dimethyl phthalate | 22.3 |
| Diethyl phthalate | 22.3 |
| Solvent and water | 0.8 |

The polyvinyl formal resin above was made by condensation of hydrolyzed polyvinyl acetate with formaldehyde and analyzed as follows:

| | Per cent |
|---|---|
| Polyvinyl acetate | 7.2 |
| Polyvinyl alcohol | 7.6 |
| Polyvinyl formal | 85.2 |

The sheeting was dipped for one minute in concentrated (38%) aqueous hydrochloric acid at room temperature, then in a bath of aqueous sodium bicarbonate where it remained until there was no further evolution of carbon dioxide. The sheeting was then washed thoroughly in water and dried at 45° C. for 3 hours.

Example 8

Sheeting the same as that described in Example 2 was dipped for 30 seconds in concentrated hydrochloric acid and then soaked in water for one hour. It was then dried in air at 45° C. for 8 hours.

Example 9

The procedure of Example 2 was followed in all respects except that the concentrated hydrochloric acid was replaced by a mixture of 3 parts concentrated hydrochloric acid and 1 part water by volume for a period of immersion of one minute or more.

Where it was necessary to eradicate tackiness but not necessary to eradicate self-adhersiveness, a shorter period of immersion was sufficient.

Example 10

The procedure of Example 2 was followed in all respects except that the concentrated hydrochloric acid was replaced by a mixture of 65 parts concentrated hydrochloric acid and 35 parts water by volume for a period of immersion of 2 minutes.

Example 11

The procedure of Example 2 was followed in all respects except that the concentrated hydrochloric acid was replaced by a mixture of equal parts by volume of concentrated hydrochloric acid and water for a period of immersion of 10 minutes.

Example 12

A commercially seasoned interlayer sheeting containing:

| | Per cent |
|---|---|
| Polyvinyl butyral resin (as in Example 1) | 68.7 |
| Triethylene glycol di-(2-ethyl butyrate) | 30.9 |
| Solvent | 0.4 | was treated in the manner described in Example 1 except that the time of immersion in the acid was slightly decreased to approximately 30 seconds. The effect of the treatment upon the initially tacky and self-adhesive surface was analogous to that described in Example 1.

Example 13

Interlayer sheeting of the composition described in Example 2 was immersed for one minute in a mixture of equal parts by volume of 38% aqueous hydrochloric acid and ethyl alcohol, then washed in water for one hour, after which it was rinsed with distilled water and dried at 45° C. for 1 hour. The surface of the sheeting was noticeably roughened by this treatment, but this roughness disappeared when the sheeting was composited with glass.

Example 14

Interlayer sheeting of the composition described in Example 2 was immersed for 20 seconds in a bath composed of concentrated hydrochloric acid, 3 parts by volume, and ethyl alcohol, one part by volume, and thereafter treated as in Example 2. The surface of the sheet was slightly roughened.

In place of ethyl alcohol, methyl alcohol may be used.

Example 15

An acid dip bath was made by mixing:

| | Parts by volume |
|---|---|
| Hydrochloric acid, concentrated | 35 |
| Glacial acetic acid | 15 |
| 2-B denatured ethyl alcohol | 50 |

Sheetings of the compositions described in Examples 2, 3, and 4 were immersed in this bath for 4 seconds and then into fresh water. The total time of contact of the acid dip solution including that involved in transferring to sheeting from the acid dip bath to the water bath was of the order of 5 seconds.

Upon removal from the water, the sheeting was thoroughly dried. It was no longer self-adhesive, its surface had become roughened, resembling sand-blasted glass, but this roughness disappeared during the subsequent compositing with sheets of glass in the manufacture of safety glass.

Example 16

A sheeting of the composition described in Example 2 was dipped for 15 seconds in glacial acetic acid, then into water for one hour, after which it was dried at 45° C. for 1 hour. This treatment was slightly less effective than that of Example 11.

Example 17

A mixture of hydrochloric acid, 2 parts by volume, and glacial acetic acid, 1 part by volume was used in place of the acid mixture described in Example 14, with equivalent results.

Example 18

An interlayer sheeting was made having the following composition:

| | Per cent |
|---|---|
| Polyvinyl butyral resin | 69 |
| Triethylene glycol di-(2-ethyl butyrate) | 31 |

The polyvinyl butyral resin above was made by condensation of hydrolyzed polyvinyl acetate with butyraldehyde and analyzed as follows:

| | Per cent |
|---|---|
| Polyvinyl acetate | 0.4 |
| Polyvinyl alcohol | 18.5 |
| Polyvinyl butyral | 81.1 |

The sheeting was immersed for 1½ minutes in concentrated hydrochloric acid, rinsed in fresh water, immersed in a saturated solution of sodium bicarbonate in water, rinsed in distilled water, and then dried.

Example 19

An interlayer sheeting having the following composition:

| | Per cent |
|---|---|
| Polyvinyl butyral resin (as in Example 18) | 69 |
| Dibutyl sebacate | 31 | was immersed for 3 minutes in concentrated hydrochloric acid, rinsed in fresh water, immersed in a saturated aqueous solution of sodium bicarbonate, and then rinsed and dried.

Example 20

An interlayer sheeting was used having the following composition:

| | Per cent |
|---|---|
| Polyvinyl butyral resin | 68 |
| Dibutyl sabacate | 32 |

The polyvinyl butyral resin above was made by condensation of hydrolyzed polyvinyl acetate with butyraldehyde and analyzed as follows:

| | Per cent |
|---|---|
| Polyvinyl acetate | 0.8 |
| Polyvinyl alcohol | 19.0 |
| Polyvinyl butyral | 80.2 |

The sheeting was dipped for one minute in a mixture of equal volumes of 98.5% sulfuric acid and distilled water at 15° C., then washed for one minute in a saturated solution of sodium bicarbonate, after which it was washed for one hour in distilled water and then dried at 45° C. for 2 hours.

Example 21

An interlayer sheeting was used having the following composition:

| | Per cent |
|---|---|
| Polyvinyl butyral resin | 69 |
| Triethylene glycol di-(2-ethyl butyrate) | 31 |

The polyvinyl butyral resin above was made by condensation of hydrolyzed polyvinyl acetate with butyraldehyde and analyzed as follows:

| | Per cent |
|---|---|
| Polyvinyl acetate | 0.4 |
| Polyvinyl alcohol | 21.5 |
| Polyvinyl butyral | 78.1 |

The sheeting was dipped for one minute in a mixture of 35 parts by volume of concentrated sulfuric acid and 65 parts by volume of water, then soaked for 30 minutes in a concentrated aqueous sodium bicarbonate, after which it was rinsed thoroughly in distilled water, and then dried at 45° C. for 1 hour.

Example 22

The sheeting of Example 2 was subjected to the treatment of that example except that, instead of sulfuric acid, a concentrated aqueous solution of hydrobromic acid was used with substantially equivalent results.

Example 23

The sheeting of Example 2 was immersed for 20 seconds in nitric acid (70%) at 25° C., then immersed for 30 minutes in aqueous sodium bicarbonate, after which it was washed with water for one hour, and dried at 45° C. for one hour.

Example 24

Apparently because of a pronounced susceptibility of triethylene glycol di-(2-ethyl butyrate) to nitric acid, sheeting containing this plasticizer became very undesirably roughened if immersed in 70% nitric acid for a single period long enough to effect eradication of self-adhesiveness; e. g., 30 seconds at room temperature. Satisfactory results were obtained, however, if the immersion was split into shorter periods and alternated with rinsing.

Thus, the sheeting of Example 12 was dipped 3 times into 70% nitric acid for 10 seconds each time, and each dip was followed by rinsing in water for 30 seconds. It was then passed into a neutralizing bath and finished as in Example 23.

Example 25

An interlayer sheeting having the following composition:

| | Percent |
|---|---|
| Polyvinyl butyral resin (as in Example 18) | 65.5 |
| Methyl myristate | 17.3 |
| Dibutyl phthalate | 17.2 | was treated as in Example 1.

Example 26

An interlayer sheeting having the following composition:

| | Percent |
|---|---|
| Polyvinyl butyral resin (as in Example 1) | 65.5 |
| Butyl laurate | 17.3 |
| Dibutyl phthalate | 17.2 | was treated as in Example 5.

Example 27

An interlayer sheeting having the following composition:

| | Percent |
|---|---|
| Polyvinyl butyral resin (as in Example 21) | 69.5 |
| Methyl myristate | 18.3 |
| Dibutyl phthalate | 12.2 | was treated as in Example 11.

Example 28

An interlayer sheeting having the following composition:

| | Percent |
|---|---|
| Polyvinyl butyral resin (as in Example 20) | 65.5 |
| Butyl laurate | 10.5 |
| Dibutyl phthalate | 24.0 | was treated as in Example 13.

It will be understood that the foregoing examples are merely illustrative and the invention broadly comprises reducing the adhesiveness of the surfaces of an organic plastic sheeting comprising a polyvinyl acetal resin and a plasticizer therefor by treating the surfaces of the sheeting with acid.

Various polyvinyl butyral and formal resins have been disclosed in the specific examples, but the invention is generally applicable to polyvinyl acetal resins such as are adapted for use as interlayers in laminated glass. Except for the polyvinyl formal resins, those polyvinyl acetal resins adapted for use in interlayer sheeting are disclosed in Reid United States Patent 2,120,628, granted June 14, 1938, entitled "Laminated glass."

Specific acids suitable for use in the present invention have been given in the examples. Of the common mineral acids, concentrated hydrochloric acid is preferred. Dilute sulfuric acid and hydrobromic acid are effective in reducing the adhesiveness of the sheeting but tend to cause discoloration if not thoroughly and promptly removed or neutralized. Hydrofluoric acid is operative. Nitric acid may be used but it necessitates greater care than the other acids mentioned and tends to produce a surface of less desirable characteristics. Hydriodic acid tends to discolor or strain the sheeting and, for this reason, is not desirable unless the sheeting is to be used in opaque laminations or for other purposes where the color of the sheeting is immaterial.

Considering the organic acids, glacial acetic acid functions both as an acid and as a solvent and is analogous in its action to a mixture of mineral acid and solvent, but it is not fully equivalent thereto because it is less thoroughly effective in destroying the adhesive character of the sheeting. For example, glacial acetic acid is somewhat less rapid and effective in its action than concentrated (38%) hydrochloric acid. Formic acid is as effective as acetic acid. Lactic acid may also be used but is less vigorous in its action. All of these organic acids have some solvent action on the sheeting, and it is believed that organic acids, in the absence of such solvent action, are not adapted for use in the present invention.

As a practical matter, hydrochloric, hydrobromic, hydrofluoric, sulfuric, nitric, acetic, and formic acids make up the group suitable for use in the present invention, although other organic acids having some solvent action on the sheeting and other mineral acids can be used.

Chemical change effected by the acid treatment is limited to the surface of the sheeting, and the sheeting is unchanged except that the tackiness, or tackiness and self-adhesiveness, of the surfaces are eradicated. The characteristics of the sheeting upon which depends its utility for use in safety glass are in no way impaired, and there is no evidence that they are altered. The treatment in accordance with the present invention does not impair the actual transparency of the sheeting nor cause it to discolor, except when hydriodic acid is used, and does not alter its characteristic behavior under impact. This absence of any alteration in the sheeting as a whole might be expected in view of the superficiality of the treatment, but it is surprising that this superficial treatment, which has so pronounced an effect upon the characteristics of the surface, does not impair in any way the ability of the surface to be bonded to glass, nor the permanence and strength of that bond.

In the present process, the acid is the primary and essential reagent. When mineral acids are used in aqueous solutions and in the absence of any solvent for the interlayer, the change in character of the surface of the interlayer is hardly visible. The surface retains its original appearance which may be glossy, matte, striated, or otherwise, according to the method of preparation and handling of the sheeting. Accordingly, there is no appearance of decrease in transparency such as results from any roughening of the surface, but, despite the virtual absence of visible change, the character of the surface is profoundly changed by the acid treatment so that it is no longer tacky and is not even self-adhesive if the treatment with the acid has been thoroughly carried out to that end.

If a solvent for the interlayer is used in admixture with an aqueous mineral acid, the action of the latter is promoted; but the use of the solvent has the further result of causing the surface of the treated sheeting to develop roughness to a degree depending upon the strength of the solvent action of the liquid used, the temperature, the duration of contact, etc. Such roughness will range from a barely noticeable "bloom" to a distinctly pitted or wrinkled condition of the surface. As solvents for the sheeting may be mentioned ethyl alcohol, methyl alcohol, dioxan, methyl "Cellosolve," methyl acetate, and mixtures thereof.

Roughening of the surface naturally obstructs vision through the sheeting and may thus interfere with inspection of the sheeting for dirt by transmitted light, but such inspection will normally have been made before the sheeting is subjected to the treatment of this invention. Any roughness produced by the treatment is ironed out in the step of bonding the sheeting to glass, in which the treated sheeting, like that of the prior art, conforms by virtue of its thermoplasticity to the surface of the glass. The actual body transparency of the plastic is in no respects impaired by the treatment of this invention. However, it will ordinarily be preferred to conduct the treatment, in accordance with the present invention, in such a way as to develop little or no roughness of surface since a roughened surface is less rapidly dried after a washing treatment by the manufacturer of safety glass and, also, may interfere somewhat with his inspection of the assembly of glass, interlayer and glass, preliminary to his application of heat and pressure thereto.

For the removal of the acid from the sheeting after its withdrawal from the acid bath, the step of neutralization is preferred but not essential in all cases. For neutralization, any convenient, inexpensive, alkaline compounds may be used if it is free from harmful effects upon the sheeting. Sodium bicarbonate, sodium carbonate, borax, sodium hydroxide, and the corresponding potassium compounds are satisfactory. Conventionally, the neutralizing bath is a saturated solution of the compound used, with an undissolved excess present to compensate for that used. A desirable feature of sodium bicarbonate is that the evolution of carbon dioxide gas indicates the progress of neutralization, and its cessation shows that neutralization is complete.

In either case, however, a wash with distilled water may precede the final step of drying in order to minimize the deposition of solid residue upon the surface of the sheeting.

The process of the present invention solves in a very simple manner the problem of overcoming the self-adhesiveness or tackiness which characterizes compositions of polyvinyl acetal resins and plasticizers therefor which are particularly valuable for the preparation of interlayers of safety glass. The undesirable quality of the surface of such sheeting is effectively eradicated with corresponding benefits and economies in handling, packing, storing, and shipping of such materials and in the mechanical procedure of assembling such sheeting with glass as a step in the manufacture of safety glass. The body transparency of the interlayer substance is not impaired nor is its ability to be bonded firmly and permanently to glass.

As many apparently widely different embodiments of this invention may be made without departing from the spirit and scope thereof, it is to be understood that the invention is not limited to the specific embodiments thereof except as defined by the appended claims.

I claim:

1. Process of reducing the adhesiveness of the surfaces of adhesive organic plastic interlayer sheeting essentially comprising polyvinyl butyral resin containing about 80% acetal calculated as polyvinyl butyral, and an ester plasticizer therefor, which process comprises treating the surfaces of the sheeting with an aqueous solution comprising an acid selected from the group consisting of hydrochloric, hydrobromic, hydrofluoric, sulfuric, nitric, acetic and formic acids, whereby the surfaces of the sheeting are rendered non-adhesive, and drying the sheeting.

2. Adhesive organic plastic interlayer sheeting essentially comprising polyvinyl butyral resin containing about 80% acetal calculated as polyvinyl butyral, and an ester plasticizer therefor, the adhesiveness of the surfaces of said sheeting having been reduced by being treated with an aqueous solution comprising an acid selected from the group consisting of hydrochloric, hydrobromic, hydrofluoric, sulfuric, nitric, acetic and formic acids, to render the surfaces of the sheeting non-adhesive, and thereafter dried.

3. Process of reducing the adhesiveness of the surfaces of adhesive organic plastic interlayer sheeting of the composition:

| | Percent |
|---|---|
| Polyvinyl butyral resin | 66 |
| Dibutyl sebacate | 28.3 |
| Aqueous ethanol | 5.7 | said polyvinyl butyral resin having the analysis:

| | Percent |
|---|---|
| Polyvinyl acetate | 0.5 |
| Polyvinyl alcohol | 19.8 |
| Polyvinyl butyral | 79.7 | which process comprises immersing said sheeting in a mixture of three parts, by volume, of concentrated aqueous hydrochloric acid, and one part, by volume, of water, for approximately one minute, neutralizing the hydrochloric acid residue remaining on the surfaces of said sheeting, washing said sheeting with an aqueous solution to remove the resulting salt from said sheeting, and drying the sheeting.

LOUIS PAGGI.

CERTIFICATE OF CORRECTION.

Patent No. 2,360,712. October 17, 1944.

LOUIS PAGGI.

It is hereby certified that error appears in the printed specification of the above numbered patent requiring correction as follows: Page 3, second column, line 12-13, for "self-adhersiveness" read --self-adhesiveness--; page 4, first column, line 2, for "to" before "sheeting" read --the--; and that the said Letters Patent should be read with this correction therein that the same may conform to the record of the case in the Patent Office.

Signed and sealed this 10th day of April, A. D. 1945.

Leslie Frazer (Seal) Acting Commissioner of Patents.